United States Patent
Daido et al.

(10) Patent No.: US 9,945,489 B2
(45) Date of Patent: Apr. 17, 2018

(54) SAFETY VALVE

(71) Applicants: FUJIKIN INCORPORATED, Osaka-shi (JP); Toyota Jidosha Kabushiki Kaisha, Toyota-shi (JP)

(72) Inventors: Kunihiko Daido, Osaka (JP); Masashi Matsuoka, Osaka (JP); Akira Yamashita, Toyota (JP); Shusuke Inagi, Toyota (JP)

(73) Assignees: FUJIKIN INCORPORATED, Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/917,156

(22) PCT Filed: Oct. 15, 2014

(86) PCT No.: PCT/JP2014/077398
§ 371 (c)(1),
(2) Date: Mar. 7, 2016

(87) PCT Pub. No.: WO2015/056696
PCT Pub. Date: Apr. 23, 2015

(65) Prior Publication Data
US 2016/0195193 A1    Jul. 7, 2016

(30) Foreign Application Priority Data
Oct. 15, 2013    (JP) ................................ 2013-214480

(51) Int. Cl.
*F16K 17/38*    (2006.01)
(52) U.S. Cl.
CPC .................. *F16K 17/383* (2013.01)

(58) Field of Classification Search
CPC .... F16K 17/383; F16K 5/0673; F16K 1/2263; F16K 41/14; E21B 34/16
(Continued)

(56) References Cited

U.S. PATENT DOCUMENTS 2,181,523 A * 11/1939 Shiels ................... F16K 31/025
                                                              137/76
3,227,170 A *  1/1966 Sigl ......................... F22B 37/42
                                                              137/73
(Continued)

FOREIGN PATENT DOCUMENTS

DE        3700473 C1    9/1988
DE        9017534 U1    3/1991
(Continued)

OTHER PUBLICATIONS

Translation of DE 3700473.*
(Continued)

*Primary Examiner* — Minh Le
(74) *Attorney, Agent, or Firm* — Locke Lord LLP

(57) ABSTRACT

A safety valve mounted on a container and configured to release gas in a container in the case where the temperature rises, in which the safety is secured and a cost reduction is achieved. A movable body 12 includes a shaft portion 21 on which a compression coil spring 13 is fitted and a flange portion 22 configured to come into contact with a fusible alloy 11 by being urged by the compression coil spring 13. The flange portion 22 of the movable body 12 is provided with through holes 35 configured to discharge the fused fusible alloy 11 into a compression coil spring arrangement space 30.

4 Claims, 3 Drawing Sheets

(58) Field of Classification Search
USPC ..... 137/72, 70, 74, 75, 76, 79, 68.11, 68.12, 137/541; 220/89.4
See application file for complete search history.

(56) References Cited

U.S. PATENT DOCUMENTS

| | | | | | |
|---|---|---|---|---|---|
| 3,431,944 | A | * | 3/1969 | Masao | F16K 1/126 137/504 |
| 3,705,691 | A | * | 12/1972 | Zenker | A62C 37/12 137/70 |
| 3,727,636 | A | * | 4/1973 | Simmons | F02M 59/46 137/541 |
| 4,261,075 | A | * | 4/1981 | Gruen | B08B 5/02 137/494 |
| 4,503,675 | A | * | 3/1985 | Gardner | A62C 37/12 137/72 |
| 5,109,881 | A | * | 5/1992 | Baker | E21B 34/16 137/72 |
| 5,275,194 | A | * | 1/1994 | Gray, Jr. | A62C 2/04 137/75 |
| 5,562,118 | A | | 10/1996 | Cross | |
| 6,269,830 | B1 | * | 8/2001 | Ingle | F16K 31/002 137/79 |
| 6,367,499 | B1 | * | 4/2002 | Taku | F16K 17/383 137/72 |
| 7,150,287 | B2 | * | 12/2006 | Kita | F16K 17/383 137/72 |
| 7,814,925 | B2 | * | 10/2010 | Nomichi | F16K 3/265 137/72 |
| 8,141,574 | B2 | * | 3/2012 | Weatherly | F16K 17/383 137/72 |
| 8,550,105 | B2 | * | 10/2013 | Ishitoya | F16K 1/307 137/72 |
| 8,844,554 | B2 | * | 9/2014 | Kikuchi | A62C 35/60 137/72 |
| 2009/0293958 | A1 | | 12/2009 | Weatherly et al. | |
| 2010/0078078 | A1 | | 4/2010 | Daido et al. | |
| 2012/0132298 | A1 | | 5/2012 | Ishitoya et al. | |

FOREIGN PATENT DOCUMENTS

| | | |
|---|---|---|
| JP | 2005-147385 A | 6/2005 |
| JP | 2008-202736 A | 9/2008 |
| JP | 2009-058088 A | 3/2009 |
| JP | 2011-012780 A | 1/2011 |
| JP | 2012-132475 A | 7/2012 |

OTHER PUBLICATIONS

Supplementary European Search Report mailed Sep. 2, 2016, issued for Europen patent application No. 14854659.1.
International Search Report mailed Jan. 13, 2015, issued for PCT/JP2014/077398.
Office Action mailed Aug. 3, 2016, issued for the Chinese patent application No. 201480019649.6 and English translation of the Examiner's statement regarding DE9017534U.

* cited by examiner

9,945,489 B2

SAFETY VALVE

TECHNICAL FIELD

The present invention relates to a safety valve and, more specifically, to a safety valve configured to release gas in a container when being mounted on the container and increasing in temperature in order to prevent an internal container pressure from rising excessing at the time of occurrence of fire or the like.

BACKGROUND ART

Known examples of such a safety valve include a safety valve provided with a fusible material configured to fuse at the time of high temperature and configured to release gas in a container by a movement of a movable plug body in association with fusion of the fusible material (PTL 1).

An example of a safety valve of the related art is illustrated in FIG. 3.

This safety valve (41) of the related art includes: a cylindrical housing (42) provided with a fusible alloy (fusible material) (11), a movable body (43) configured to move in association with fusion of the fusible alloy (11) and a compression coil spring (13) configured to urge the movable body (43) toward the fusible alloy (11); a main body (3) fixed to a right end portion of the housing (42) and extending downward; a movable plug body (4) arranged in a movable plug body arrangement passage (5) in the main body (3) so that an upper end portion thereof projects inward of the housing (42) and configured to move in association of a movement of the movable body (43); and a relief passage (6) communicating with the movable plug body arrangement passage (5) and configured to be opened by the movement of the movable plug body (4).

The safety valve (41) is used with the main body (3) thereof mounted on a container and, for example, a fire occurs and the temperature rises, the fusible alloy (11) fuses at a predetermined temperature and, accordingly, the movable body (43) urged leftward by the compression coil spring (13) moves leftward, and accordingly, the movable plug body (4) is allowed to move and is moved upward by an internal container pressure, whereby gas in the container is discharged through the movable plug body arrangement passage (5) and the relief passage (6) of the main body (3).

With the safety valve (41) of the related art, a discharge port (44) of the fused fusible alloy (11) is provided so as to penetrate through a peripheral wall (42a) of the housing (42), and the fused fusible alloy (11) passes through the discharge port (44) and discharged to the outside of the housing (42).

PTL 1: JP-A-2008-202736

DISCLOSURE OF INVENTION

Technical Problem

The safety valve (41) of the related art has a probability of entry of water or dust into the safety valve (41) from the outside through the discharge port (through hole) (44) provided on the housing (42) and, in this case, an operation failure of the safety valve (41) may be caused. Therefore, the discharge port (44) is clogged with a pin formed of a fusible alloy. In this case, however, an increase in cost is caused.

It is an object of the present invention to provide a safety valve mounted on the container and configured to release gas in a container in the case where the temperature rises, in which safety is secured and a cost reduction is achieved.

Solution to Problem

The safety valve of the present invention is a safety valve including: a fusible material, a cylindrical housing provided with a movable body configured to move in association with fusion of the fusible material and a compression coil spring configured to urge the movable body toward the fusible material; a main body fixed to the housing; a movable plug body in the main body arranged in a movable plug body arrangement passage and configured to move in association with the movement of the movable body; a relief passage communicating with the movable plug body arrangement passage and configured to be opened by the movement of the movable plug body, characterized in that the movable body includes a shaft portion to which the compression coil spring is fitted, and a flange portion coming into contact with the fusible material by being urged by the compression coil spring, and the flange portion of the movable body is provided with through holes configured to discharge the fused fusible material into a compression coil spring arrangement space.

The through holes may be four through holes each having a diameter of 1.5 mm, for example, and being provided equidistantly in a circumferential direction. However, the invention is not limited thereto, and the diameter and the number of the through holes may be set to suitable values.

According to the safety valve of the present invention, in the case where a temperature in the periphery of the container to which the safety valve is mounted exceeds a fusing temperature of the fusible material, the fusible material is fused and, accordingly, the movable body moves to allow the movement of the movable plug body and the movable plug body moves by an internal container pressure, so that gas in the container is released through the movable plug body arrangement passage and the relief passage of the main body, whereby the container is prevented from bursting.

The fused fusible material passes through the through holes provided on the flange portion of the movable body, and is discharged into the compression coil spring arrangement space. In other words, by using the compression coil spring arrangement space as a destination of discharge of the fused fusible material, a passage of the fused fusible material is formed in the interior of the safety valve. Accordingly, the discharge port provided in the related art so as to penetrate through a peripheral wall of the housing is no longer necessary, and hence entry of water and dust from the discharge port is avoided and hence the cause of the operation failure of the safety valve is eliminated. Therefore, clogging the discharging port with a pin formed of the fusible alloy is not necessary as well, so that the cost reduction is achieved.

Preferably, counter borings are formed at edge portions of the through holes opening into the compression coil spring arrangement space. In other words, it is preferable to increase the size of exits of the passages of the fused fusible material and, in this configuration, the fused fusible material is reliably discharged.

Further preferably, the shaft portion of the movable body is provided with an annular groove communicating with the through holes at end on the flange portion side. In this configuration, a space portion of the compression coil spring arrangement space, which is the destination of discharge of the fused fusible material, is increased in size, so that the fused fusible material can be discharged further reliably.

Advantageous Effects of Invention

According to the safety valve of the present invention, since the through hole penetrating through the peripheral wall of the housing may be eliminated, entry of water or dust is prevented even during the use under an environment susceptible to entry of water and dust. Therefore, clogging the discharging port with the pin formed of the fusible alloy, which has been necessary in the related art, is no longer necessary, so that the cost reduction is achieved.

REFERENCE SIGNS LIST (1): safety valve, (2): housing, (3): main body, (4): movable plug body, (5): movable plug body arrangement passage, (6): relief passage, (11): fusible alloy (fusible material), (12): movable body, (13): compression coil spring, (21): shaft portion, (22): flange portion, (30): compression coil spring arrangement space, (35): through hole, (36): counter boring, (37): annular groove

DESCRIPTION OF EMBODIMENTS

Embodiments of the invention will be described below with reference to the drawings. In the following description, up, down, left and right indicate up, down, left and right in figures. The expressions up and down are determined on the basis of the case where the safety valve is mounted on an upper surface of a container. However, the expressions up and down are for convenience only, and the safety valve may be mounted upside down or transversely from the reference state.

Figure 1:
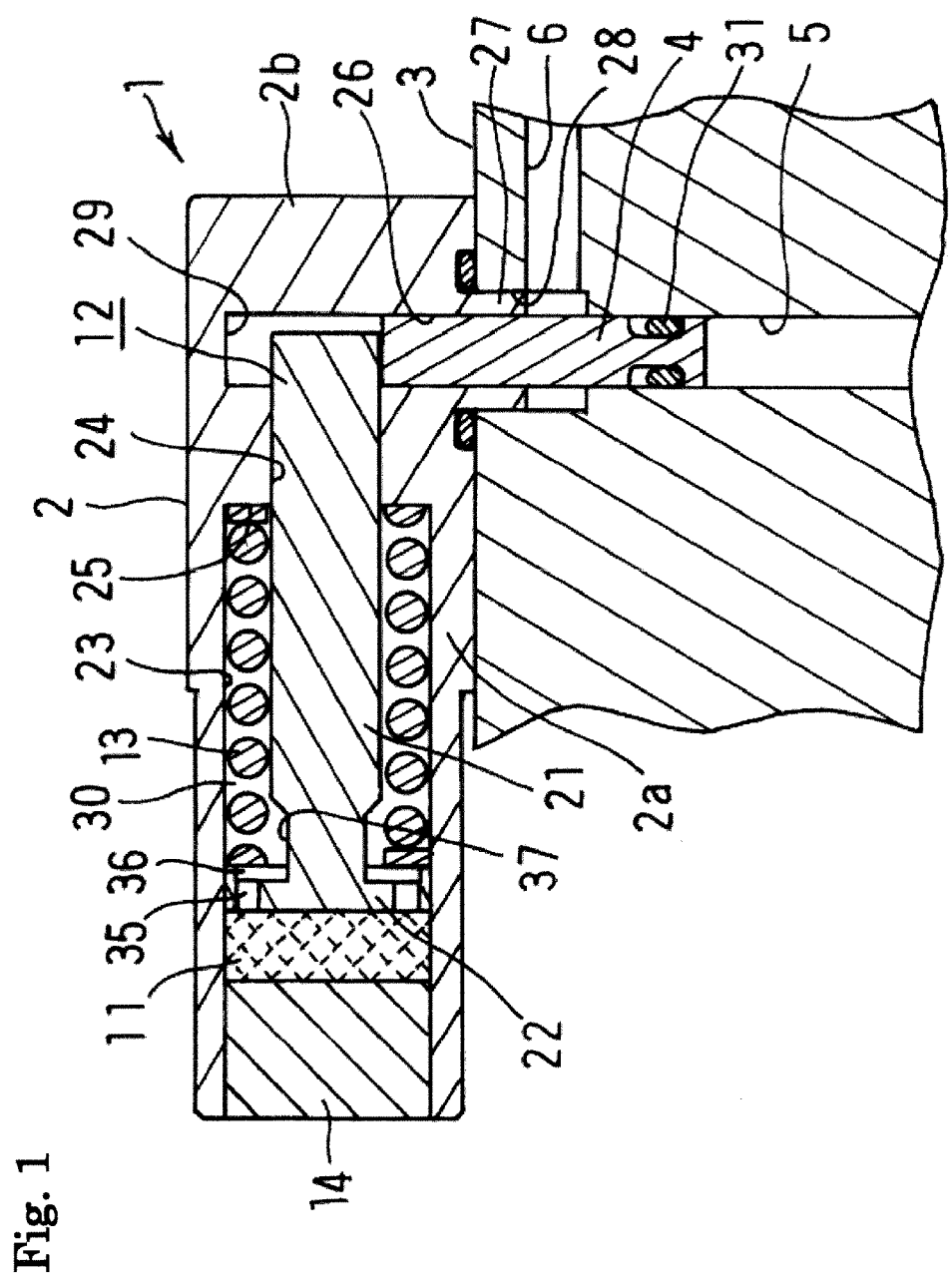
FIG. 1 is a cross-sectional view of a safety valve according to an embodiment of the present invention, illustrating a normal state (closed state).
Figure 2:
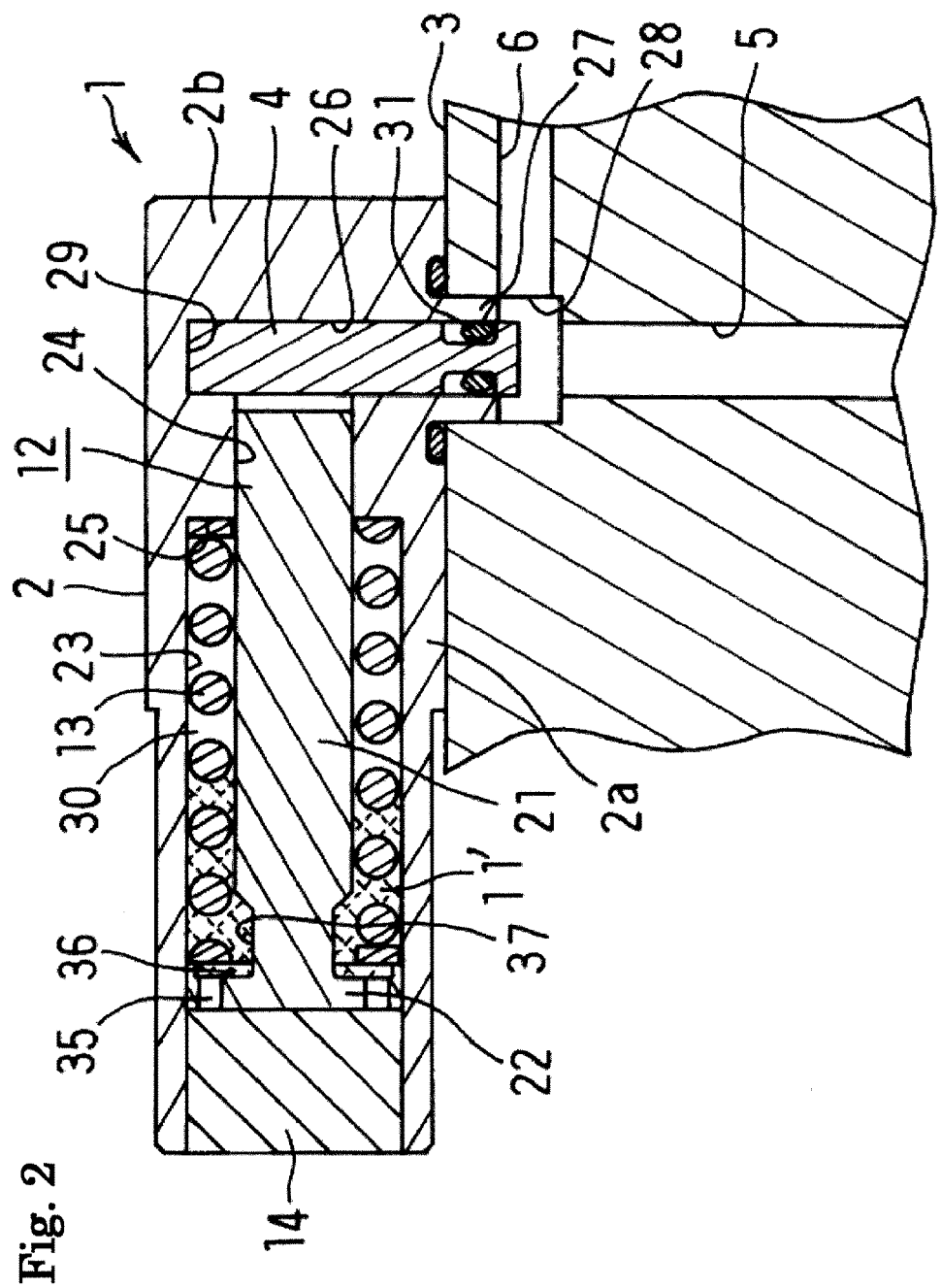
FIG. 2 illustrates an operating state of the safety valve in FIG. 1.

FIG. 1 and FIG. 2 illustrate an embodiment of a safety valve of the present invention. FIG. 1 illustrates a normal state in which the environmental temperature of the safety vale is not higher than a predetermined value, that is, in a state in which the passages are closed. FIG. 2 is a state in which a safety valve (1) is activated in response to an occurrence of abnormality.

The safety valve (1) of the present invention includes: a cylindrical housing (2) provided with a fusible alloy (fusible material) (11), a movable body (12) configured to move in association with fusion of the fusible alloy (11), and a compression coil spring (13) configured to urge the movable body (12) toward the fusible alloy (11); a main body (3) fixed to a right end portion of the housing (2) and extending downward; a movable plug body (4) arranged in a movable plug body arrangement passage (5) in the main body (3) so that an upper end portion thereof projects inward of the housing (2) and moving in association with the movement of the movable body (12), and a relief passage (6) communicating with the movable plug body arrangement passage (5) and configured to be opened by the movement of the movable plug body (4).

The safety valve (1) is used with the main body (3) thereof mounted on the container and is activated at the time of abnormality and, the abnormality corresponds, for example, to a case where a fire occurs and the temperature rises and, in this case, the fusible alloy (11) fuses at a predetermined temperature and, accordingly, the movable body (12) urged leftward by the compression coil spring (13) moves leftward to allow the movable plug body (4) to move, and accordingly, the movable plug body (4) is moved upward by the internal container pressure, whereby gas in the container is discharged through the movable plug body arrangement passage (5) and the relief passage (6) of the main body (3).

A shape of the main body (3) is determined in accordance with a mounting form of the container and, only a principal portion is illustrated in FIG. 1 and FIG. 2.

The right end portion of the housing (2) is closed by a bottom wall (2b). A cap (14) is fitted and fixed to a left end portion of the housing (2).

The movable body (12) includes a shaft portion (21) extending in leftward and rightward, and a flange portion (22) provided at a left end of the shaft portion (21).

The fusible alloy (11) has a disc shape, and is arranged between a right surface of the cap (14) and a left surface of the flange portion (22) of the movable body (12).

A large diameter cylindrical surface (23) having a diameter corresponding to an outer diameter of the flange portion (22) of the movable body (12) is formed in the interior of the housing (2) so as to extend rightward from the left end, and a small diameter cylindrical surface (24) having a diameter corresponding to the outer diameter of the shaft portion (21) of the movable body (12) is provided so as to continue from the right end of the large diameter cylindrical surface (23).

A normally movable plug body positioning passage (26) extending downward is provided at the right end portion of the housing (2) so as to penetrate through a peripheral wall (2a). A cylindrical projecting portion (27) extending downward from the peripheral wall (2a) is provided at an opening edge portion of the normally movable plug body positioning passage (26) of the peripheral wall (2a). The cylindrical projecting portion (27) is fitted to an upper portion of an annular fitting depression (28) provided on an upper surface of the main body (3). An in-operation movable plug body positioning depression (29) is provided so as to oppose the movable plug body positioning passage (26) via the small diameter cylindrical surface (24) provided on an upper surface of an inner periphery of a right end portion of the peripheral wall (2a) of the housing (2).

The compression coil spring (13) is fitted into the large diameter cylindrical surface (23), is received at a left end by the right surface of the flange portion (22) of the movable body (12) and is received at a right end by a shouldered surface (25) at a boundary between the large diameter cylindrical surface (23) and the small diameter cylindrical surface (24). A portion between the large diameter cylindrical surface (23) and the shaft portion (21) of the movable body (12) corresponds to a compression coil spring arrangement space (30).

The movable plug body (4) is fitted into the movable plug body arrangement passage (5) and the normally movable plug body positioning passage (26) so as to be movable and a seal ring (31) is fitted to an outer periphery thereof. The movable plug body (4) is brought into contact with a right end portion of the shaft portion (21) of the movable body (12), whereby the upward movement of the movable plug body (4) is prevented. The seal ring (31) provided on the movable plug body (4) is in tight contact with an inner peripheral surface of the movable plug body arrangement passage (5), whereby leakage of gas from the movable plug body arrangement passage (5) in the normal state is prevented.

In the case where the movable body (12) moves leftward and an upward movement of the movable plug body (4) is enabled, the movable plug body (4) is moved upward by the internal container pressure.

The relief passage (6) is formed so as to continue from a lower portion of the fitting depression (28) on the upper surface of the main body (3) and extend in a direction orthogonal to the movable plug body arrangement passage (5). Therefore, when the lower end of the movable plug body (4) moves into the interior of the lower portion of the fitting depression (28), gas in the interior of the container is released via the relief passage (6).

Figure 3:
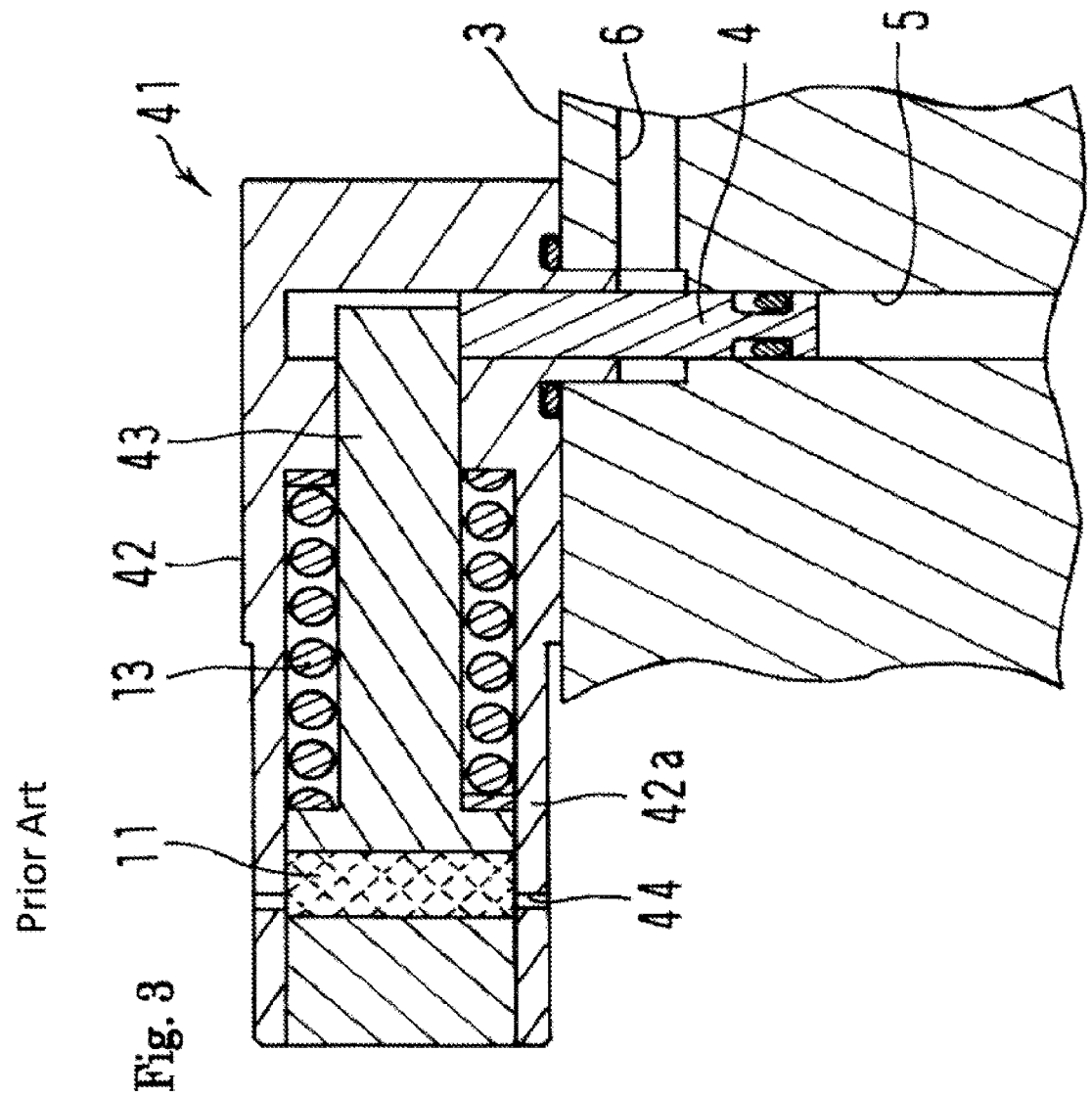
FIG. 3 is a cross-sectional view of a safety valve according to an embodiment of the related art, illustrating a normal state (closed state).

In the safety valve (1) of this embodiment, a discharge port (through hole) (44), which is provided in a housing (42), is eliminated in comparison with the safety valve of the related art illustrated in FIG. 3, and a plurality of through holes (35), which serve as discharge ports, are formed in the flange portion (22) of the movable body (12). Four of the through holes (35) are provided at every 90° in the circumferential direction. The diameter of the through hole (35) is on the order of 1 to 2 mm, for example, φ 1.5 mm.

The flange portion (22) receives the compression coil spring (13), and the compression coil spring arrangement space (30) is provided on the right side of the flange portion (22), so that the through holes (35) communicate with the compression coil spring arrangement space (30).

Counter borings (36) are formed at edge portions of the through holes (35) opening into the compression coil spring arrangement space (30). The shaft portion (21) of the movable body (12) is provided with an annular groove (37) communicating with the through holes (35) at the end portion on the flange portion side.

When the temperatures of the safety valve (1) and the container become high, the fusible alloy (11) is fused at a predetermined temperature and is discharged into the compression coil spring arrangement space (30) through the through holes (35). At this time, the fused fusible alloy (11) spreads to a portion of the counter borings (36) of the through holes (35) as indicated by a numeral (11') in FIG. 2, and flows into the annular groove (37). Accordingly, a flow of the fused fusible alloy (11') is not hindered by the compression coil spring (13), and is discharged reliably into the compression coil spring arrangement space (30).

In this manner, according to the safety valve (1) of the embodiment described above, passages (passages composed of the through holes (35), the counter borings (36), and the annular groove (37)) for discharging the fusible alloy (11) are formed without providing the housing (2) with the through hole opening toward the outside. With this safety valve (1), since the through hole opening to the outside by penetrating through the peripheral wall (2a) of the housing (2) is not provided, entry of water and dust is prevented even in the case of being used under the environment which is susceptible to entry of water and dust, and hence clogging of the through hole (44) with the pin formed of a fusible alloy, which has been required in the related art, is no longer necessary, and hence the cost reduction may be achieved.

The safety valve (1) of this embodiment described above was immersed in glycerin heated to 130° C. and time required for activation was measured. However, the time required for activation of this invented article has no different from that of the related art illustrated in FIG. 3. Since a resilient force (approximately 30 kg) of the compression coil spring (13) is applied to the movable body (12), when the fusible alloy (11) enters the through holes (35) of the movable body (12) by creeping, there arises a probability of erroneous operation. However, it was confirmed that there was no such erroneous operation.

INDUSTRIAL APPLICABILITY

It is an object of the present invention to provide a safety valve mounted on the container and configured to release gas in a container in the case where rising in temperature, in which the safety is secured and a cost is lowered, thereby contributing to an improvement of the safety of the container.

The invention claimed is:
1. A safety valve comprising:
a cylindrical housing provided with a fusible material, a movable body configured to move in association with fusion of the fusible material and a compression coil spring configured to urge the movable body toward the fusible material; a main body fixed to the housing; a movable plug body arranged in a movable plug body arrangement passage in the main body and configured to move in association with the movement of the movable body; a seal ring fitted to an outer periphery of the movable plug body and the seal ring is in tight contact with an inner peripheral surface of the moveable plug body arrangement passage; a relief passage communicating with the movable plug body arrangement passage and configured to be opened by the movement of the movable plug body, wherein
the movable body includes a shaft portion to which the compression coil spring is fitted, and a flange portion coming into contact with the fusible material by being urged by the compression coil spring, and the flange portion of the movable body is provided with through holes configured to discharge the fused fusible material into a compression coil spring arrangement space which is enclosed between the cylindrical housing and the movable body; and
wherein the movable plug does not move into the compression coil spring space when the relief passage is opened.
2. The safety valve according to claim 1, wherein counter borings are formed at edge portions of the through holes opening into the compression coil spring arrangement space.
3. The safety valve according to claim 1, wherein the shaft portion of the movable body is provided with an annular groove communicating with the through holes at an end portion on the flange portion.
4. The safety valve according to claim 2, wherein the shaft portion of the movable body is provided with an annular groove communicating with the through holes at an end portion on the flange portion.

* * * * *